(12) United States Patent
Kawai

(10) Patent No.: US 10,077,720 B2
(45) Date of Patent: Sep. 18, 2018

(54) CONTROL APPARATUS FOR A GAS-TURBINE AEROENGINE

(71) Applicant: HONDA MOTOR CO., LTD., Tokyo (JP)

(72) Inventor: Keisuke Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 612 days.

(21) Appl. No.: 14/689,306

(22) Filed: Apr. 17, 2015

(65) Prior Publication Data

US 2016/0305346 A1  Oct. 20, 2016

(51) Int. Cl.
*F02C 9/28* (2006.01)
*F02C 9/18* (2006.01)
*F02D 31/00* (2006.01)

(52) U.S. Cl.
CPC .............. *F02C 9/285* (2013.01); *F02C 9/18* (2013.01); *F02D 31/007* (2013.01)

(58) Field of Classification Search
CPC .... F02C 9/00; F02C 9/26; F02C 9/263; F02C 9/28; F02C 9/285; F02C 9/48; F02C 9/50; F02C 9/52; F02C 9/16; F02C 9/18; F02C 6/08; F02D 31/007; F05D 2270/051; F05D 2270/02; F05D 2270/021; F05D 2270/022; F05D 2270/023

USPC ............................................................. 60/773
See application file for complete search history.

(56) References Cited

U.S. PATENT DOCUMENTS

| | | | | |
|---|---|---|---|---|
| 4,186,556 A * | 2/1980 | Lowry | ....................... | F02C 9/32 60/39.27 |
| 5,385,012 A * | 1/1995 | Rowe | ........................ | F02C 9/18 60/779 |
| 5,394,689 A * | 3/1995 | D'Onofrio | ................ | F02C 9/28 60/204 |
| 2008/0163931 A1 | 7/2008 | Brocard et al. | | |

FOREIGN PATENT DOCUMENTS

JP    2008-530443    8/2008

* cited by examiner

*Primary Examiner* — Phutthiwat Wongwian
*Assistant Examiner* — Loren Edwards
(74) *Attorney, Agent, or Firm* — Rankin, Hill & Clark LLP

(57) ABSTRACT

An apparatus for controlling a gas-turbine aeroengine is configured to calculate a fuel command to supply fuel based on a calculated desired rotational speed of a low-pressure turbine calculated from an operation angle of a thrust lever installed at an aircraft cockpit pilot's seat, determines whether it is a time point for outputting a command to open/close a bleed-off valve equipped at a high-pressure compressor connected to a high-pressure turbine and to supply the fuel command based on the time point when it is determined to be the time point for outputting the command to open/close the bleed-off valve.

15 Claims, 5 Drawing Sheets

CONTROL APPARATUS FOR A GAS-TURBINE AEROENGINE

BACKGROUND OF THE INVENTION

Field of the Invention

An embodiment of this invention relates to control apparatus for a gas-turbine aeroengine.

Description of the Related Art

A gas-turbine aeroengine is typically equipped with at least a high-pressure turbine rotated by injection of high-pressure gas produced upon ignition/combustion of an air-fuel mixture in a combustion chamber and with a low-pressure turbine located downstream of the high-pressure turbine to be rotated by low-pressure gas exiting the high-pressure turbine. In such a gas-turbine aeroengine, a fuel supply command value Wf is ordinarily calculated based on a desired low-pressure turbine rotational speed N1 calculated in response to a thrust lever operation angle and control is performed to achieve this value. Fluctuation of the compressor outlet pressure P3 therefore causes fluctuation of the fuel quantity Wf.

Aside from the above, air flowing through a high-pressure compressor connected to the high-pressure turbine is bled from a compression passage to a duct (bypass) side through a BOV (Bleed Off Valve). When the BOV is closed, the amount of bleed air decreases as the BOV opening decreases, so that a compressor outlet pressure P3 transiently rises owing to an increase in the amount of air flowing on the compression passage side.

As this increases the fuel quantity Wf, the low-pressure turbine rotational speed rises to produce stronger engine thrust, which may give the crew an unnatural feeling. This becomes significant when the fuel supply command value is calculated as a ratio Wf/P3 of the fuel quantity Wf relative to the compressor outlet pressure P3.

PCT Japanese Publication No. 2008-530443 (Patent Document 1) teaches a technique for controlling fuel supply in a gas turbine engine which suppresses engine thrust fluctuation by regulating opening of a fuel supply valve (over-thrust countermeasure valve)

SUMMARY OF THE INVENTION

Although the technique set forth in Patent Document 1 can suppress engine thrust fluctuation by regulating a fuel supply valve opening, it ignores and cannot hold down engine thrust fluctuation owing to air quantity fluctuation caused by BOV opening/closing.

Therefore, an object of this invention is to overcome the aforesaid problem by providing a control apparatus for a gas-turbine aeroengine configured to suppress engine thrust fluctuation related to air quantity fluctuation caused by BOV opening/closing.

In order to achieve the object, this invention provides in its first aspect an apparatus for controlling a gas-turbine aeroengine mounted on an aircraft and having at least a high-pressure turbine rotated by injection of high-pressure gas produced upon ignition and combustion of an air-fuel mixture in a combustion chamber, a low-pressure turbine located downstream of the high-pressure turbine to be rotated by low-pressure gas exiting the high-pressure turbine and a bleed-off valve equipped at a high-pressure compressor connected to the high-pressure turbine and adapted to be open to bleed off air flowing through a compression passage of the high-pressure compressor, comprising: a desired low-pressure turbine rotational speed calculator that calculates a desired rotational speed of the low-pressure turbine based on an operation angle of a thrust lever installed at an aircraft cockpit pilot's seat; a fuel command calculator that calculates a fuel command to supply fuel in the air-fuel mixture based on the calculated desired rotational speed of the low-pressure turbine; a bleed-off valve open/close command output time point determiner that determines whether it is a time point for outputting a command to open/close the bleed-off valve; and a fuel command supplier that supplies the fuel command based on the time point when it is determined to be the time point for outputting the command to open/close the bleed-off valve.

In order to achieve the object, this invention provides in its second aspect a method for controlling a gas-turbine aeroengine mounted on an aircraft and having at least a high-pressure turbine rotated by injection of high-pressure gas produced upon ignition and combustion of an air-fuel mixture in a combustion chamber, a low-pressure turbine located downstream of the high-pressure turbine to be rotated by low-pressure gas exiting the high-pressure turbine and a bleed-off valve equipped at a high-pressure compressor connected to the high-pressure turbine and adapted to be open to bleed off air flowing through a compression passage of the high-pressure compressor, comprising the steps of: calculating a desired rotational speed of the low-pressure turbine based on an operation angle of a thrust lever installed at an aircraft cockpit pilot's seat; calculating a fuel command to supply fuel in the air-fuel mixture based on the calculated desired rotational speed of the low-pressure turbine; determining that determines whether it is a time point for outputting a command to open/close the bleed-off valve; and supplying the fuel command based on the time point when it is determined to be the time point for outputting the command to open/close the bleed-off valve.

BRIEF DESCRIPTION OF DRAWINGS

The above and other objects and advantages of the invention will be more apparent from the following description and drawings in which.

DESCRIPTION OF EMBODIMENT

An embodiment of a control apparatus for a gas-turbine aeroengine according to the present invention will now be explained with reference to the attached drawings.

Figure 1:
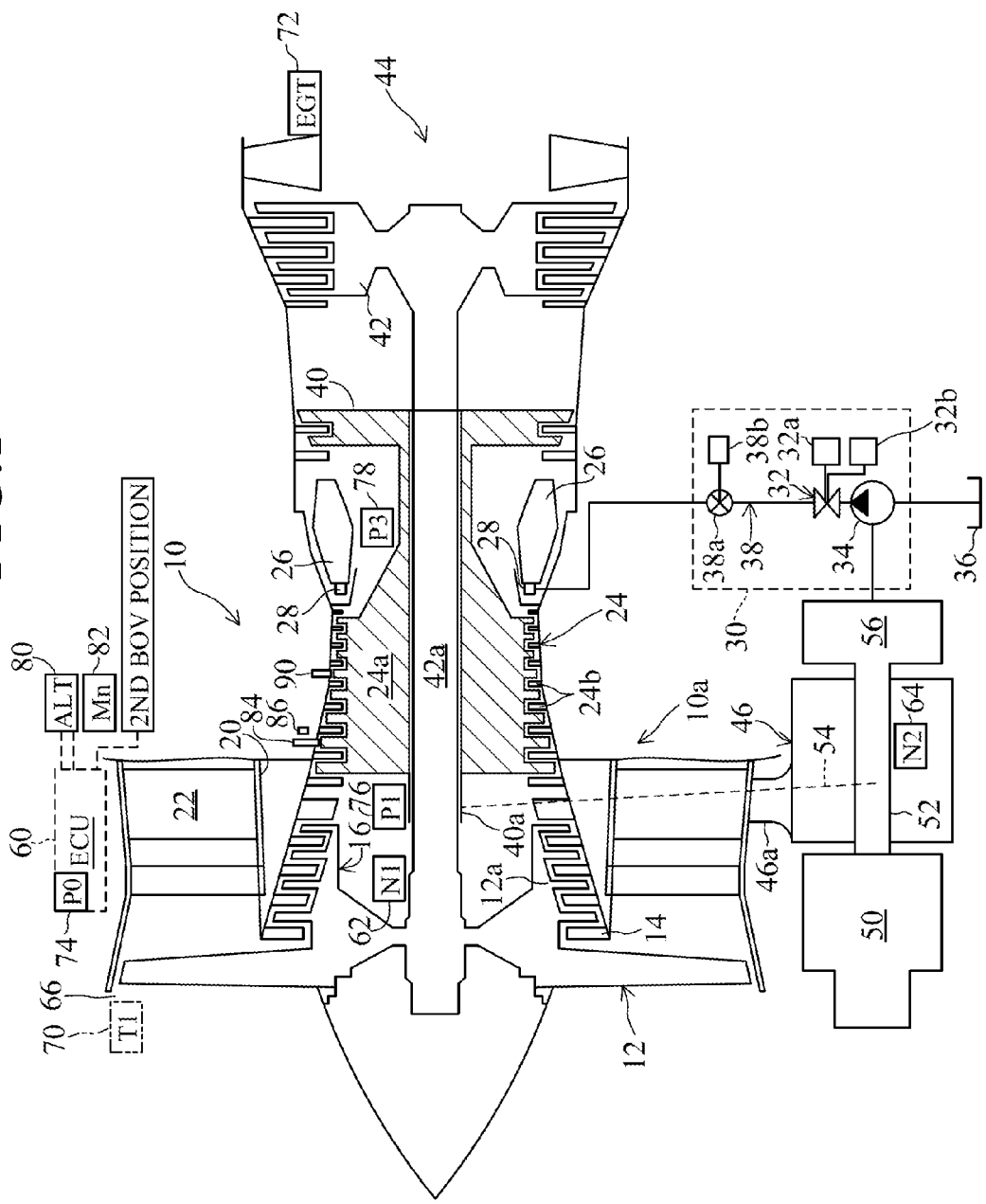
FIG. 1 is an overall schematic view of a control apparatus for a gas-turbine aeroengine according to a first embodiment of the invention.

FIG. 1 is an overall schematic view of the control apparatus for a gas-turbine aeroengine.

Four types of gas-turbine aeroengines are known: the turbojet engine, turbofan engine, turboprop engine and turboshaft engine. A two-shaft turbofan engine will be taken as an example in the following explanation.

In FIG. 1, reference numeral 10 designates the turbofan engine (gas turbine engine; hereinafter referred to as "engine"). Reference numeral 10a designates a main engine unit. Two of the engines 10 are installed, one on either side of an aircraft (whose airframe is not shown).

The engine 10 is equipped with a fan (fan blades) 12 that sucks in external air while rotating rapidly. A rotor 12a is formed integrally with the fan 12. The rotor 12a and a stator 14 facing it together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The wind from the fan 12 produces a force of reaction that acts on the airframe (not shown) on which the engine 10 is mounted as a propulsive force (thrust). Most of the propulsion is produced by the air flow from the fan.

The air compressed by the low-pressure compressor 16 flows rearward to a high-pressure compressor 24 where it is further compressed by a rotor 24a and stator 24b and then flows rearward to a combustion chamber 26.

The combustion chamber 26 is equipped with a fuel nozzle 28 that is supplied with pressurized fuel metered by an FCU (fuel control unit) 30. The FCU 30 is equipped with a fuel metering valve (FMV) 32. Fuel pumped by a fuel pump 34 from a fuel tank 36 located at an appropriate part of the airframe is metered by the fuel metering valve 32 and supplied to the fuel nozzle 28 through a fuel supply line 38.

The fuel metering valve 32 is connected to a torque motor 32a to be opened/closed thereby. The position of the fuel metering valve 32 is detected by a nearby valve position sensor 32b. A fuel shutoff valve (SOV) 38a is interposed in the fuel supply line 38. The fuel shutoff valve 38a is connected to an electromagnetic solenoid 38b to be opened/closed thereby.

The fuel nozzle 28 sprays the fuel supplied through the fuel supply line 38.

The fuel sprayed from the fuel nozzle 28 and compressed air supplied from the high-pressure compressor 24 are mixed in the combustion chamber 26 and the air-fuel mixture is burned after being ignited at engine starting by an ignition unit (not shown) comprising an exciter and a sparkplug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a.

After driving the high-pressure turbine 40, the hot high-pressure gas is sent to a low-pressure turbine 42 to rotate it at relatively low speed. The low-pressure turbine 42 is connected to the rotor 12a of the low-pressure compressor 16 through a low-pressure turbine shaft 42a (in a dual concentric structure with the shaft 40a), so as to rotate the rotor 12a and fan 12. The gas having passed through the high-pressure turbine 40 is lower in pressure than gas jetted from the combustion chamber 26.

The exhaust gas exiting the low-pressure turbine 42 (turbine exhaust gas) is mixed with the fan exhaust air passing as is through the duct 22 and jetted together rearward of the engine 10 through a jet nozzle 44.

An accessory drive gearbox (hereinafter referred to as "gearbox") 46 is attached to the outer undersurface at the front end of the main engine unit 10a through a stay 46a. An integrated starter/generator (hereinafter called "starter") 50 is attached to the front of the gearbox 46. The FCU 30 is located at the rear of the gearbox 46.

At starting of the engine 10, the starter 50 rotates a shaft 52 whose rotation is transmitted through a drive shaft 54 (and a gear mechanism including a bevel gear etc. (not shown)) to the high-pressure turbine shaft 40a to generate compressed air. The generated compressed air is supplied to the combustion chamber 26, as mentioned above.

The rotation of the shaft 52 is also transmitted to a PMA (permanent magnet alternator) 56 and the (high-pressure) fuel pump 34, whereby, as explained above, the fuel pump 34 is driven to supply metered fuel to the fuel nozzle 28 so as to be mixed with compressed air and atomized. The resulting air-fuel mixture is ignited to start combustion.

When the engine 10 reaches self-sustaining operating speed, the rotation of the high-pressure turbine shaft 40a is transmitted back to the shaft 52 through the drive shaft 54 (and the gear mechanism including the bevel gear etc. (not shown)) to drive the fuel pump 34 and also drive the PMA 56 and starter 50.

As a result, the PMA 56 generates electricity and the starter 50 also generates electricity to be supplied to the airframe. Therefore, particularly when the electrical load on the airframe side increases, power generated by the starter 50 increases and rotational load on the high-pressure turbine shaft increases, thereby affecting the high-pressure turbine rotational speed, as will be explained later.

An ECU (Electronic Control Unit) 60 is installed at an upward location of the main engine unit 10a. The ECU 60 is equipped with a microcomputer comprising a CPU, ROM, RAM, I/O etc. (none of which are shown) and is housed in a container for mounting at the upward position.

An N1 sensor (rotational speed sensor) 62 is installed near the low-pressure turbine shaft 42a of the engine 10 and outputs a signal indicating the rotational speed of the low-pressure turbine (rotational speed of the low-pressure turbine shaft 42a) N1 (so as to detect the speed N1), and an N2 sensor (rotational speed sensor) 64 is installed near the shaft 52 and outputs a signal indicating the rotational speed of the high-pressure turbine (rotational speed of the high-pressure turbine shaft 40a) (so as to detect the speed N2).

A T1 sensor (temperature sensor) 70 installed near an air intake 66 at the front of the main engine unit 10a outputs a signal indicating the engine inlet temperature (ambient or intake temperature) T1 (so as to detect the temperature the temperature T1). An EGT sensor (exhaust gas temperature sensor) 72 installed at a suitable location downstream of the low-pressure turbine 42 outputs a signal indicating the exhaust gas temperature (low-pressure turbine outlet temperature) EGT (so as to detect the temperature EGT).

A P0 sensor (pressure sensor) 74 installed inside the container that houses the ECU 60 outputs a signal indicating atmospheric pressure P0 (so as to detect the pressure P0), and a P1 sensor (pressure sensor) 76 installed near the air intake 66 outputs a signal indicating engine inlet pressure (air intake pressure) P1 (so as to detect the inlet pressure P1 of the engine 10). In addition, a P3 sensor 78 installed downstream of the high-pressure compressor 24 outputs a signal indicating compressor outlet pressure (outlet pressure of the high-pressure compressor 24) P3 (so as to detect the pressure P3).

The outputs of the foregoing sensors indicating the operating condition of the engine 10 are sent to the ECU 60.

On the airframe side are installed a flight altitude sensor 80 that produces an output indicating the flight altitude ALT of the aircraft (so as to detect the flight altitude ALT) and a flight speed sensor 82 that produces an output indicating the flight speed Mn (Mach Number) of the aircraft (so as to detect the speed Mn). The outputs of these sensors are also sent to the ECU 60 comprising a computer on the airframe side.

The high-pressure compressor 24 is equipped with a first BOV (Bleed Off Valve) 84 at a location of its front stage. During starting, low-speed operation and the like of the engine 10, some of the compressed air flowing through a compression passage of the high-pressure compressor 24 is bled off through the first BOV 84 and discharged into the duct 22.

The first BOV 84 is opened and closed by an electromagnetic solenoid valve operated by commands from the ECU 60. A BOV position sensor 86 installed near the first BOV 84 to produce and send to the ECU 60 a signal indicating the amount of bled air bled through the first BOV 84 based on the position (opening angle) of the first BOV 84 (so as to detect the bleed air amount).

In addition, the high-pressure compressor 24 is equipped with a second BOV (Bleed Off Valve) 90 at a location downstream of the first BOV 84, and some of the compressed air flowing through a compression passage of the high-pressure compressor 24 is bled off through the second BOV 90 and sent to the cabin etc. on the airframe side for airframe cabin pressurization, air conditioning, wing de-icing, air sealing and other purposes.

The second BOV 90 is opened and closed by an electromagnetic solenoid valve in response to manual operation of a switch by a pilot seated in the cockpit of the airframe. An airframe side computer sends the ECU 60 a signal indicating the switch operation, i.e., the position of the second BOV 90. The ECU 60 determines whether second BOV 90 is opened or not, more broadly it determines the amount of air passing through the high-pressure compressor 24 and bled through the second BOV 90 based on the position of the second BOV 90.

Further, the ECU 60 is responsive to the TLA (Thrust Lever Angle), namely, the pilot's angle of operation of a thrust lever installed at the aircraft cockpit pilot's seat for controlling the operation of the torque motor 32a to open/close the fuel metering valve 32 and for energizing/de-energizing the electromagnetic solenoid 38b to open/close the fuel shutoff valve 38a and control supply of fuel to the fuel nozzle 28.

Furthermore, the ECU 60 controls operation of the engine 10 to suppress engine thrust fluctuation related to air quantity fluctuation caused by opening/closing of the first BOV 84.

Figure 2:
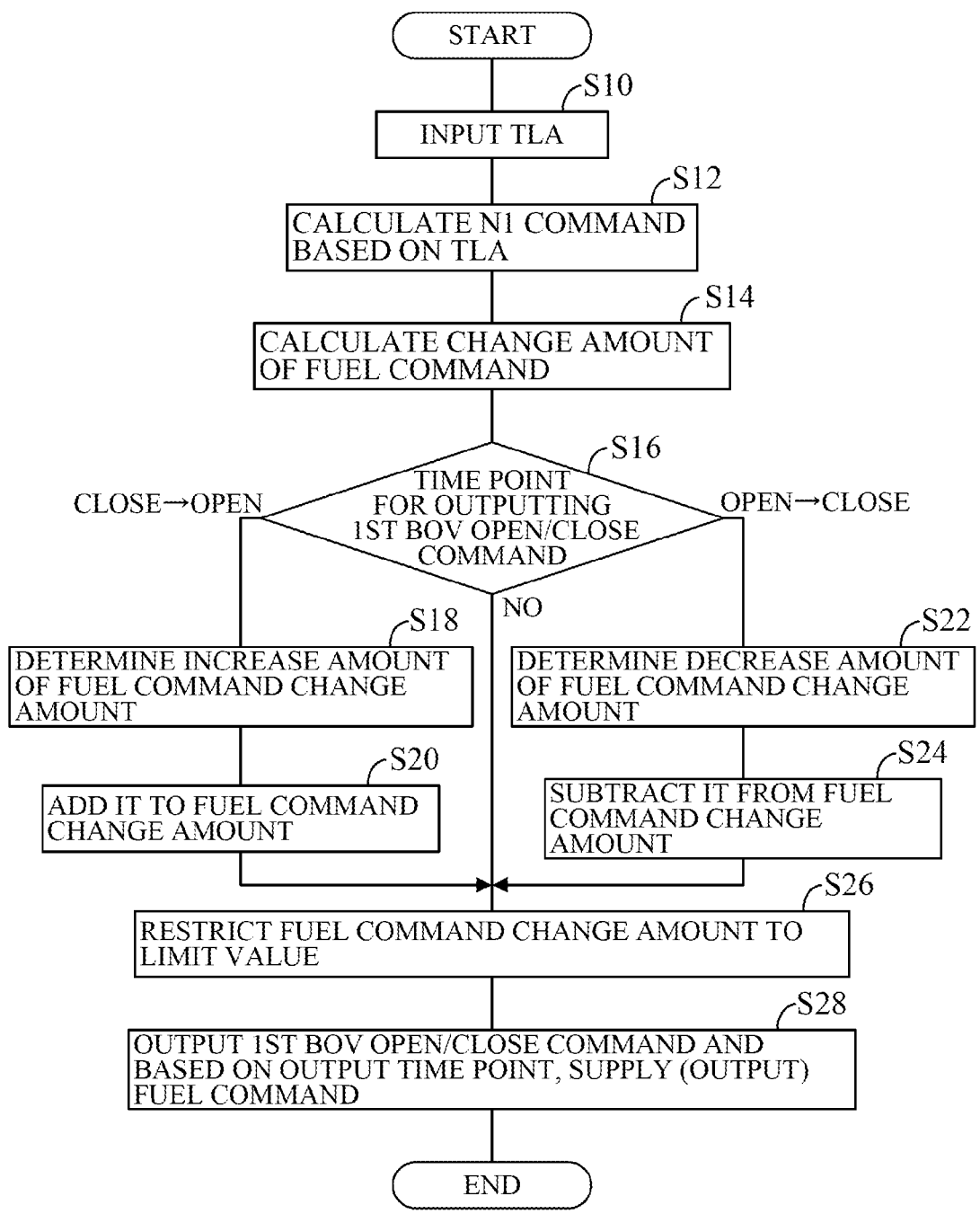
FIG. 2 is a flowchart for explaining operation of the apparatus shown in FIG. 1.

FIG. 2 is a flowchart showing the operations (processing) of the ECU 60. The illustrated processing is executed at predetermined time intervals.

Explaining this, in S10, the thrust lever operation angle TLA is inputted. Then, in S12, an N1 command (desired value of the rotational speed N1 of the low-pressure turbine 42) is calculated based on the inputted thrust lever operation angle TLA.

Next, in S14, a fuel command change amount (amount of change in a fuel command (fuel supply command value)) is calculated based on the calculated N1 command. Specifically, the fuel command is calculated as a ratio Wf/P3 of a fuel quantity Wf relative to the outlet pressure P3 of the high-pressure compressor 24 connected to the high-pressure turbine 40. The fuel command change amount is obtained by calculating the derivative of the fuel command Wf/P3.

Next, in S16, it is determined whether it is a time point for outputting a first BOV 84 open/close command, i.e., a command to open or close the first BOV 84 to be outputted.

When it is determined in S16 that it is a time point for outputting of the first BOV 84 open/close command and it is further determined that it is of the command being for opening the first BOV 84 from the closed state, the program goes to S18, in which an amount of increase of the fuel command change amount is determined or calculated, and to S20, in which the calculated amount is added to the fuel command change amount calculated in S14 (upward correction of the fuel command change amount is implemented).

On the other hand, when it is determined in S16 that it is a time point for outputting of a first BOV 84 open/close command and it is determined that it is of the command being for closing the first BOV 84 from the open state, the program goes to S22, in which an amount of decrease of the fuel command change amount is determined, and to S24, in which the calculated amount is subtracted from the fuel command change amount calculated in S14 (downward correction of the fuel command change amount is implemented). When it is determined in S16 that it is not the time point for outputting the first BOV 84 open/close command, the program goes directly to S26.

Next, in S26, the calculated fuel command change amount is compared with an upper or lower limit value and restricted thereto when in excess.

Next, in S28, the first BOV 84 open/close command, i.e., the command for opening or closing the valve 84 is outputted, and based on the output time point of the open/close command, the calculated fuel command Wf/P3 is supplied (outputted). Specifically at the same time as the outputting of the first BOV 84 open/close command (simultaneously with the output time point), the calculated fuel command Wf/P3 is supplied (outputted).

The supply (output) of the fuel command Wf/P3 causes the FCU 30 to operate the fuel regulating valve 32 and inject fuel, pumped from the fuel tank 36, into the combustion chamber 26 through the fuel supply passage 38 and fuel nozzle 28.

Figure 3:
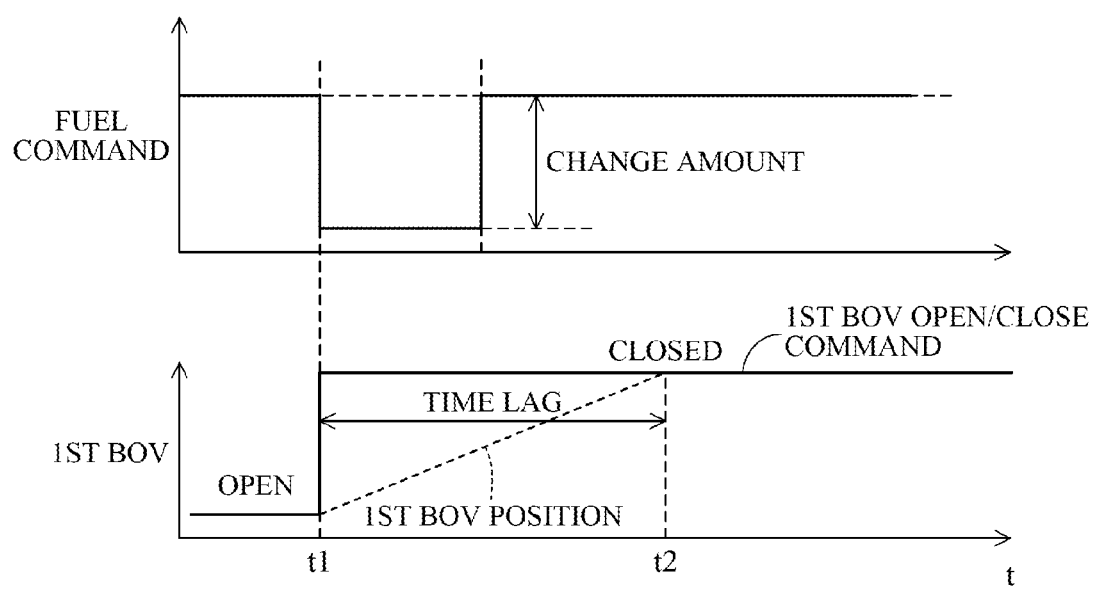
FIG. 3 is a time chart for explaining processing of the flowchart of FIG. 2.

FIG. 3 is a time chart explaining the operations (processing) of the flowchart of FIG. 2.

Explaining this, where time t1 is assumed to be the output time point at which a valve close command is to be outputted to the electromagnetic solenoid valve for opening/closing the first BOV 84, then even if the ECU 60 outputs a first BOV 84 close command at this time point, a time lag (of around 0.5 to 2.0 seconds, for example) arises up to the time point at which the first BOV 84 actually closes (assumed to be time point t2).

Therefore, anticipating such time lag, this embodiment is configured to supply (output) the fuel command (fuel supply command value) Wf/P3 at an early stage (in a feed-forward manner) based on the output time point of the first BOV 84 open/close command.

More specifically, in the configuration according to the first embodiment, it is determined whether it is a time point for outputting the open/close command for opening or closing the first BOV 84, and when it is determined that it is the open/close command output time point, upward or downward correction of the fuel command change amount is implemented based on the output time point of the first BOV 84 open/close command; more specifically, an increase/decrease command value for implementing upward or downward correction of the fuel command change amount is supplied (outputted) at the time point for outputting the open/close command to open or close the first BOV 84.

With this, the response delay of the engine 10 can be compensated and thrust fluctuation of the engine 10 related to air quantity fluctuation caused by opening or closing of the first BOV 84 can be suppressed. Although FIG. 3 shows the case of closing the first BOV 84 from the open state, the case of opening the valve from the closed state is of course analogous.

Further, since the fuel command (fuel supply command value) is calculated as the ratio Wf/P3 of the fuel quantity Wf relative to the outlet pressure P3 of the high-pressure compressor 24 connected to the high-pressure turbine 40, the thrust fluctuation of the engine 10 related to air quantity fluctuation caused by opening or closing of the first BOV 84 can be suppressed more effectively.

Figure 4:
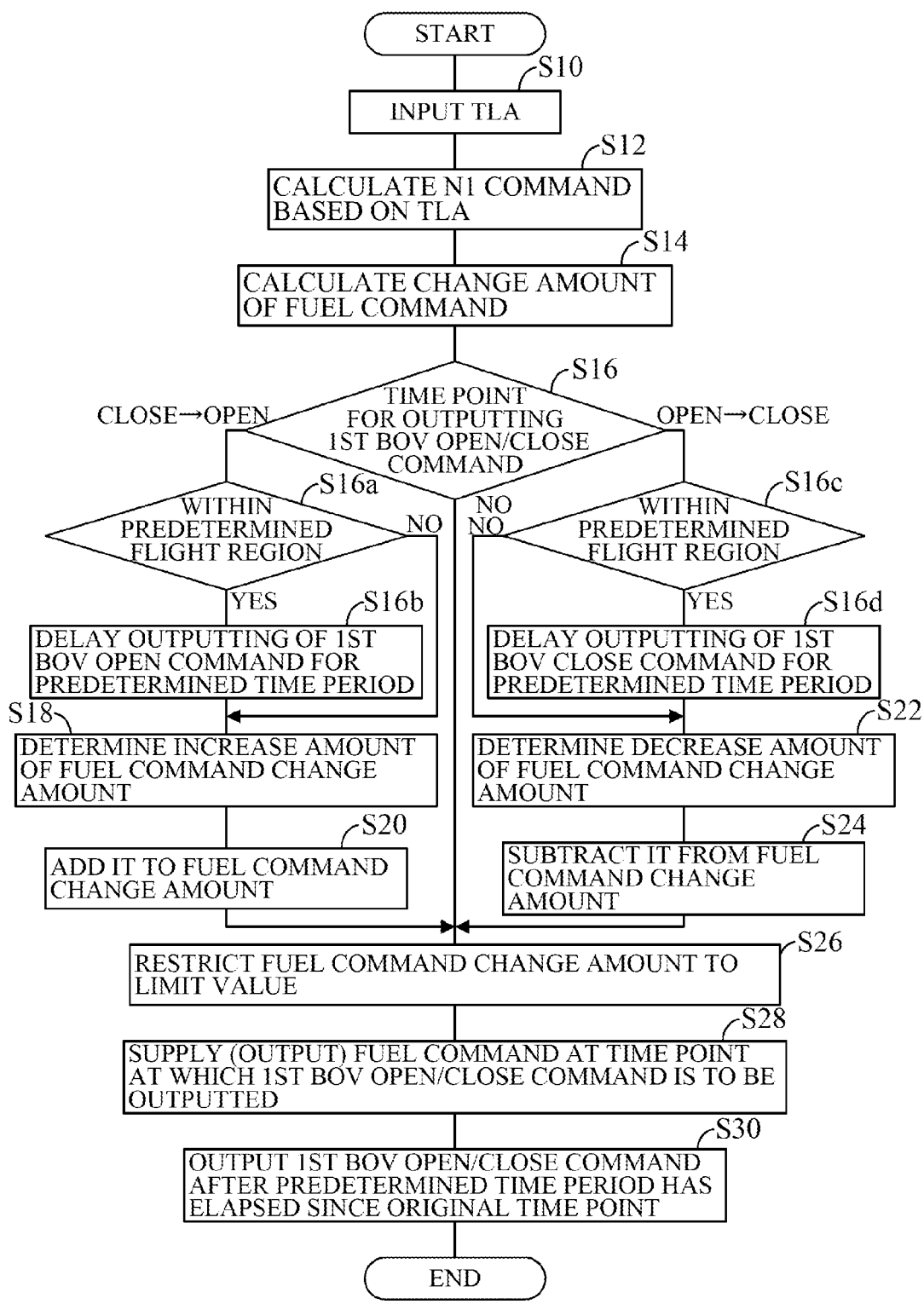
FIG. 4 is a flowchart for explaining operation of a control apparatus for a gas-turbine aeroengine according to a second embodiment of the invention.
Figure 5:
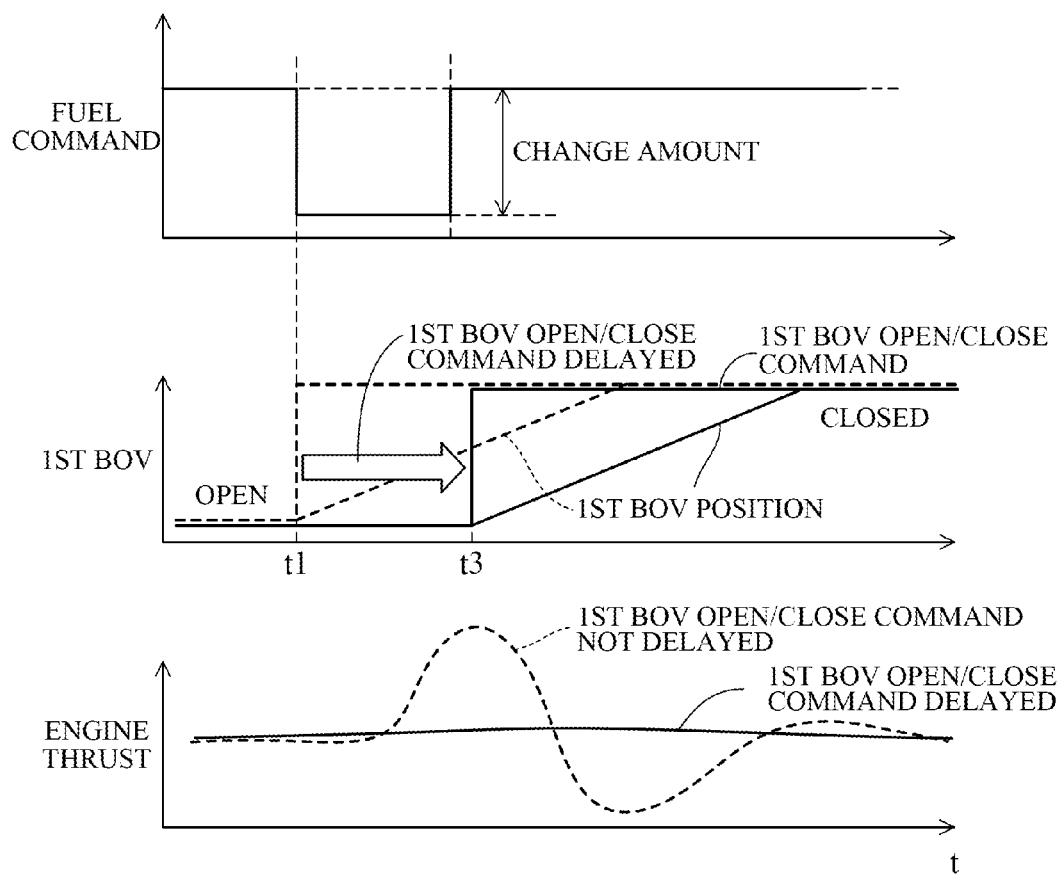
FIG. 5 is a time chart for explaining processing of the flowchart of FIG. 4.

FIG. 4 is a flowchart similar to that of FIG. 2 showing the operations (processing) of a control apparatus for a gas-turbine aeroengine according to a second embodiment of this invention. FIG. 5 is a time chart explaining the operations (processing) of the flowchart of FIG. 4.

Now follows an explanation focused on the points of difference from the first embodiment. In the second embodiment, similarly to in the first embodiment, after performing the processing from S10 to S14, the program goes to S16, in which it is determined whether it is the time point for outputting the first BOV 84 open/close command, i.e., the command to open or close the first BOV 84.

When it is determined in S16 that it is the time point for outputting of the first BOV 84 open/close command and it is further determined that it is of the command being for opening the first BOV 84 from the closed state, the program goes to S16a, in which it is discriminated whether the aircraft is within a predetermined flight region. Concretely speaking, the predetermined flight region here means a region of relatively high altitude and relatively low flight speed.

When the result in S16a is YES, the program goes to S16b, in which the output of the open/close command (open command) of S16 is delayed or put on hold for a predetermined time period. The program then goes to S18, in which an amount of increase of the fuel command change amount is determined, and to S20, in which it is added to the fuel command change amount calculated in S14.

Similarly, when it is determined in S16 that it is the time point for outputting of the first BOV 84 open/close command and it is determined that it is of the command being for closing the first BOV 84 from the open state, the program goes to S16c, in which it is discriminated whether the aircraft is within the predetermined flight region.

When the result in S16c is YES, the program goes to S16d, in which the output of the open/close command (close command) of S16 is also delayed for the predetermined time period. The program then goes to S22, in which an amount of decrease of the fuel command change amount is determined, and to S24, in which it is subtracted from the fuel command change amount calculated in S14. The processing of S16b or S16d is skipped when it is determined in S16 that it is not the time point for the first BOV open/close command, or the result in S16a or S16c is NO.

Next, as in the first embodiment, the program goes to S26, in which the calculated fuel command change amount is compared with the upper or lower limit value and restricted thereto when in excess.

Next, in S28, the calculated fuel command Wf/P3 is supplied (outputted) based on the output time point of the first BOV 84 open/close command of S16, more specifically the calculated fuel command Wf/P3 is supplied (outputted) at the original time point at which the first BOV 84 open/close command is to be outputted.

Next, in S30, the first BOV 84 open/close command of S16 is outputted after a predetermined time period has elapsed since the original time point.

More specifically, the inventor discovered that when the aircraft in which the engine 10 is installed flies within the predetermined flight region, specifically a region of relatively high altitude and relatively low flight speed, the response of the engine 10 slows to the point that the fuel supply correction undesirably leads to the rotational speed N1 of the low-pressure turbine 42 overshooting (or undershooting) the desired value, so that engine thrust fluctuates greatly.

In the second embodiment, therefore, when it is discriminated that the aircraft is within the predetermined flight region and it is the output time point for outputting of the open/close command to open or close the first BOV 84, output of the first BOV 84 open/close command is, as shown in FIG. 5, delayed from the original time point t1 by a predetermined time period, e.g., up to time point t3.

Explaining this with reference to FIG. 5, as indicated by the broken-line curve at the bottom of the drawing, when the output of the command to open/close the first BOV 84 is not delayed (is output at time point t1), the fuel quantity reducing action is delayed, with the result that engine thrust once rapidly rises and then rapidly falls owing to the quantity reducing action.

In contrast, as stated above, in the case of presence within the predetermined region, the second embodiment delays the output to the first BOV 84 to time point t3 after a predetermined time period (t3) has elapsed since the original time point (t1) as indicated by solid line, whereby the effect of fuel quantity reduction can be moderated, thereby making it possible to smooth engine thrust and suppress fluctuation thereof. The remaining structural aspects and effects are the same as those of the first embodiment.

With this, in the second embodiment, the response delay of the engine 10 can be compensated and thrust fluctuation of the engine 10 related to air quantity fluctuation caused by opening or closing of the first BOV 84 can be suppressed, even when the aircraft in which the engine 10 is installed flies within the predetermined flight region.

Although FIG. 5 shows the case of closing the first BOV 84 from the open state, the case of opening the valve from the closed state is of course analogous as in the case of FIG. 3.

As stated above, the first and second embodiments are configured to have an apparatus (and method) for discriminating ignition in a gas-turbine aeroengine (10) mounted on an aircraft and having at least a high-pressure turbine (40) rotated by injection of high-pressure gas produced upon ignition and combustion of an air-fuel mixture in a combustion chamber (26), a low-pressure turbine (42) located downstream of the high-pressure turbine to be rotated by low-pressure gas exiting the high-pressure turbine, and a bleed-off valve (first BOV 84) equipped at a high-pressure compressor (24) connected to the high-pressure turbine and adapted to be open to bleed off air flowing through a compression passage of the high-pressure compressor, comprising: a desired low-pressure turbine rotational speed calculator (ECU 60, S10, S12) that calculates a desired rotational speed of the low-pressure turbine (42) (N1) based on an operation angle of a thrust lever (TLA) installed at an aircraft cockpit pilot's seat; a fuel command calculator (ECU 60, S14) that calculates a fuel command (fuel supply command value) to supply fuel in the air-fuel mixture based on the calculated desired rotational speed of the low-pressure turbine; a bleed-off valve open/close command output time point determiner (ECU 60, S16) that determines whether it is a time point for outputting a command to open/close the bleed-off valve; and a fuel command supplier (ECU 60, S18-S28) that supplies the fuel command based on the time point when it is determined to be the time point for outputting the command to open/close the bleed-off valve.

More specifically, a time lag (of, say, about 0.5 to 2.0 sec) is present between the output of the first BOV 84 open or close command and actual valve closing (or valve opening), so that even though engine response to fuel increase or decrease is delayed, outputting the fuel command based on the open/close command output time point in the foregoing manner makes it possible, as a result, to compensate the engine response delay by implementing the up/down correction early (in a feed-forward manner), thereby enabling suppression of engine thrust fluctuation.

In the apparatus, the fuel command supplier supplies the fuel command at the time point for outputting the command to open/close the bleed-off valve when it is determined to be the time point for outputting the command to open/close the bleed-off valve (ECU 60, S28), thereby enabling still more reliable suppression of engine thrust fluctuation related to air quantity fluctuation caused by opening/closing of the first BOV 84.

In the apparatus, the fuel command supplier increases the fuel command to supply when the command is an open command for opening the bleed-off valve (ECU 60, S16, S18-S20), thereby enabling suppression of engine thrust fluctuation related to air quantity fluctuation caused by opening of the first BOV 84.

More specifically, bleeding of some of the air to the duct (bypass) side by change of the first BOV 84 from closed to open reduces the air flowing through the compression passage, which in the absence of any countermeasure transiently reduces the compressor outlet pressure P3 to lower the low-pressure turbine rotational speed N1 and decrease the engine thrust, but the upward correction of the fuel command makes it possible to suppress this decrease and thereby enable suppression of engine thrust fluctuation.

In the apparatus, the fuel command supplier decreases the fuel command to supply when the command is an close command for closing the bleed-off valve (ECU 60, S16, S22-S24), thereby enabling suppression of engine thrust fluctuation related to air quantity fluctuation caused by closing of the first BOV 84.

More specifically, cutoff of bleed air to the duct (bypass) side by change of the BOV from open to closed increases the amount of air flowing through the compression passage, which in the absence of any countermeasure transiently increases the compressor outlet pressure P3 to raise the low-pressure turbine rotational speed N1 and increase the engine thrust, but the downward correction of the fuel command makes it possible to suppress this increase and thereby enable suppression of engine thrust fluctuation.

In the apparatus, the fuel command supplier discriminates whether the aircraft is within a predetermined flight region, and supplies the fuel command at the time point (t1) for outputting the command to open/close the bleed-off valve and delays outputting of the command to open/close the bleed-off valve for a predetermined time period (t3) since the time point (t1) when the aircraft is discriminated to be within the predetermined flight region (ECU 60, S16a-S16d, S18-S30), thereby enabling more effective suppression of engine thrust fluctuation related to air quantity fluctuation caused by opening/closing of the first BOV 84 also within a predetermined region of relatively high altitude and also relatively low flight speed.

More specifically, the inventor discovered that within a predetermined region, specifically a region of relatively high altitude and relatively low flight speed, fuel supply correction in response to the first BOV 84 opening or closing is delayed, with the result that the low-pressure turbine rotational speed N1 overshoots (or undershoots) the desired value. A configuration was therefore adopted wherein, within such region, upon determination of coincidence with the output time point of the open/close command for closing, opening or closing the first BOV 84, whether or not present within the predetermined region is discriminated, and when presence within the predetermined region is discriminated, the fuel command is supplied (outputted) at the time point for outputting the open/close command output, and the output of the open/close command is delayed for a predetermined time period after the output time point for outputting the open/close command output, thereby enabling more effective suppression of engine thrust fluctuation related to air quantity fluctuation caused by opening or closing of the first BOV 84 also within the predetermined region.

In the apparatus, the fuel command supplier increases the fuel command to supply when the command is an open command for opening the bleed-off valve (ECU 60, S16, S18, S20), thereby enabling suppression of engine thrust fluctuation related to air quantity fluctuation caused by closing of the first BOV 84.

In the apparatus, the fuel command supplier decreases the fuel command to supply when the command is a close command for closing the bleed-off valve (ECU 60, S16, S22-S24), thereby enabling suppression of engine thrust fluctuation related to air quantity fluctuation caused by closing of the first BOV 84.

In the apparatus, the fuel command calculator calculates the fuel command as a ratio (Wf/P3) of a fuel quantity (Wf) relative to an output pressure of the high-pressure compressor (P3, S14), thereby enabling still more reliable suppression of engine thrust fluctuation related to air quantity fluctuation caused by opening/closing of the first BOV 84.

While the invention has thus been shown and described with reference to a specific embodiment, it should be noted that the invention is in no way limited to the details of the described arrangements; changes and modifications may be made without departing from the scope of the appended claims.

What is claimed is:

1. An apparatus for controlling a gas-turbine aeroengine mounted on an aircraft and having at least a high-pressure turbine rotated by injection of high-pressure gas produced upon ignition and combustion of an air-fuel mixture in a combustion chamber, a low-pressure turbine located downstream of the high-pressure turbine to be rotated by low-pressure gas exiting the high-pressure turbine and a bleed-off valve equipped at a high-pressure compressor, the high-pressure compressor connected to the high-pressure turbine, and the bleed-off valve adapted to be open to bleed off air flowing through a compression passage of the high-pressure compressor, the apparatus comprising:

a desired low-pressure turbine rotational speed calculator that calculates a desired rotational speed of the low-pressure turbine based on an operation angle of a thrust lever installed at an aircraft cockpit pilot's seat;

a fuel command calculator that calculates a fuel command to supply fuel in the air-fuel mixture based on the calculated desired rotational speed of the low-pressure turbine;

a bleed-off valve open/close command output time point determiner that determines whether it is a time point for outputting a command to open/close the bleed-off valve; and a fuel command supplier that supplies the fuel command based on the time point when it is determined to be the time point for outputting the command to open/close the bleed-off valve, wherein the fuel command supplier increases the fuel command to supply when the command to open/close the bleed-off valve is an open command for opening the bleed-off valve, and decreases the fuel command to supply when the command to open/close the bleed-off valve is a close command for closing the bleed-off valve, wherein the fuel command supplier compares the increased or decreased fuel command to supply with an upper or lower limit value and restricts the increased or decreased fuel command to supply when in excess to the upper or lower limit value.

2. The apparatus according to claim 1, wherein the fuel command supplier supplies the fuel command at the time point for outputting the command to open/close the bleed-off valve when it is determined to be the time point for outputting the command to open/close the bleed-off valve.

3. The apparatus according to claim 1, wherein the fuel command supplier discriminates whether the aircraft is within a predetermined flight region, and supplies the fuel command at the time point for outputting the command to open/close the bleed-off valve and delays outputting of the command to open/close the bleed-off valve for a predetermined time period since the time point when the aircraft is discriminated to be within the predetermined flight region.

4. The apparatus according to claim 1, wherein the fuel command calculator calculates the fuel command as a ratio of a fuel quantity relative to an output pressure of the high-pressure compressor.

5. A method for controlling a gas-turbine aeroengine mounted on an aircraft using the apparatus of claim 1, comprising the steps of:

calculating the desired rotational speed of the low-pressure turbine based on the operation angle of the thrust lever installed at an aircraft cockpit pilot's seat;

calculating the fuel command to supply fuel in the air-fuel mixture based on the calculated desired rotational speed of the low-pressure turbine;

determining whether it is the time point for outputting the command to open/close the bleed-off valve; and supplying the fuel command based on the time point when it is determined to be the time point for outputting the command to open/close the bleed-off valve.

6. The method according to claim 5, wherein the step of fuel command supplying supplies the fuel command at the time point for outputting the command to open/close the bleed-off valve when it is determined to be the time point for outputting the command to open/close the bleed-off valve.

7. The method according to claim 5, wherein the step of fuel command supplying increases the fuel command to supply when the command to open/close the bleed-off valve is the open command for opening the bleed-off valve.

8. The method according to claim 5, wherein the step of fuel command supplying decreases the fuel command to supply when the command to open/close the bleed-off valve is the close command for closing the bleed-off valve.

9. The method according to claim 5, wherein the step of fuel command supplying discriminates whether the aircraft is within a predetermined flight region, and supplying the fuel command at the time point for outputting the command to open/close the bleed-off valve and delaying outputting of the command to open/close the bleed-off valve for a predetermined time period since the time point when the aircraft is discriminated to be within the predetermined flight region.

10. The method according to claim 9, wherein the step of fuel command supplying increases the fuel command to supply when the command to open/close the bleed-off valve is the open command for opening the bleed-off valve.

11. The method according to claim 9, wherein the step of fuel command supplying decreases the fuel command to supply when the command to open/close the bleed-off valve is the close command for closing the bleed-off valve.

12. The method according to claim 5, wherein the step of fuel command calculating calculates the fuel command as a ratio of a fuel quantity relative to an output pressure of the high-pressure compressor.

13. An apparatus for controlling a gas-turbine aeroengine mounted on an aircraft and having at least a high-pressure turbine rotated by injection of high-pressure gas produced upon ignition and combustion of an air-fuel mixture in a combustion chamber, a low-pressure turbine located downstream of the high-pressure turbine to be rotated by low-pressure gas exiting the high-pressure turbine and a bleed-off valve equipped at a high-pressure compressor, the high-pressure compressor connected to the high-pressure turbine, and the bleed-off valve adapted to be open to bleed off air flowing through a compression passage of the high-pressure compressor, the apparatus comprising:

a desired low-pressure turbine rotational speed calculator that calculates a desired rotational speed of the low-pressure turbine based on an operation angle of a thrust lever installed at an aircraft cockpit pilot's seat;

a fuel command calculator that calculates a fuel command to supply fuel in the air-fuel mixture based on the calculated desired rotational speed of the low-pressure turbine;

a bleed-off valve open/close command output time point determiner that determines whether it is a time point for outputting a command to open/close the bleed-off valve; and a fuel command supplier that supplies the fuel command based on the time point when it is determined to be the time point for outputting the command to open/close the bleed-off valve, wherein the fuel command supplier discriminates whether the aircraft is within a predetermined flight altitude region, and supplies the fuel command at the time point for outputting the command to open/close the bleed-off valve and delays outputting of the command to open/close the bleed-off valve for a predetermined time period since the time point when the aircraft is discriminated to be within the predetermined flight altitude region.

14. The apparatus according to claim 13, wherein the fuel command supplier increases the fuel command to supply when the command to open/close the bleed-off valve is an open command for opening the bleed-off valve.

15. The apparatus according to claim 13, wherein the fuel command supplier decreases the fuel command to supply when the command to open/close the bleed-off valve is a close command for closing the bleed-off valve.

* * * * *